(12) United States Patent
Hirao et al.

(10) Patent No.: US 8,718,872 B2
(45) Date of Patent: May 6, 2014

(54) VEHICLE ATTITUDE CONTROLLER

(75) Inventors: Ryusuke Hirao, Kamagaya (JP); Toru Uchino, Yokohama (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 0 days.

(21) Appl. No.: 13/240,355

(22) Filed: Sep. 22, 2011

(65) Prior Publication Data

US 2012/0078470 A1 Mar. 29, 2012

(30) Foreign Application Priority Data

Sep. 27, 2010 (JP) ................................ 2010-216068

(51) Int. Cl.
*B60G 17/016* (2006.01)
*B60W 10/22* (2006.01)
*B60W 30/02* (2012.01)

(52) U.S. Cl.
CPC ........... *B60G 17/0162* (2013.01); *B60W 10/22* (2013.01); *B60W 30/025* (2013.01); *B60W 2710/226* (2013.01); *B60G 2400/204* (2013.01); *B60G 2400/0521* (2013.01); *B60G 2400/0522* (2013.01); *B60G 2400/0523* (2013.01); *B60G 2500/10* (2013.01); *B60G 2800/012* (2013.01); *B60G 2800/014* (2013.01)
USPC .......................................................... 701/38

(58) Field of Classification Search
CPC . B60W 30/025; B60W 10/22; B60W 10/184; B60W 2520/16; B60W 2520/18; B60W 2720/16; B60G 17/08; B60G 2400/0521; B60G 2400/0522; B60G 2400/0523; B60G 2400/204; B60G 2400/252; B60G 2400/41
See application file for complete search history.

(56) References Cited

U.S. PATENT DOCUMENTS

| 5,911,768 | A  | * | 6/1999  | Sasaki    | 701/38 |
| 6,295,493 | B1 | * | 9/2001  | Kawazoe   | 701/38 |
| 6,366,841 | B1 | * | 4/2002  | Ohsaku    | 701/37 |
| 6,505,108 | B2 | * | 1/2003  | Bodie et al. | 701/41 |
| 7,136,730 | B2 | * | 11/2006 | Lu et al. | 701/36 |
| 7,337,047 | B2 | * | 2/2008  | Ueno et al. | 701/38 |
| 7,702,442 | B2 | * | 4/2010  | Takenaka  | 701/48 |

(Continued)

FOREIGN PATENT DOCUMENTS

| JP | 6-288876    | 10/1994 |
| JP | 2007-170590 | 7/2007  |
| JP | 2007-290650 | 11/2007 |

*Primary Examiner* — John R Olszewski
*Assistant Examiner* — Todd Melton
(74) *Attorney, Agent, or Firm* — Wenderoth, Lind & Ponack, L.L.P.

(57) ABSTRACT

A vehicle attitude controller capable of improving turning operability, steering stability, and ride quality of a vehicle. In a normal-operation region, a pitch control unit for calculating a target pitch rate in accordance with a roll rate performs control in priority to a roll suppression section. In this case, a target damping force calculated in the pitch control unit is weighed to control a damping-force characteristic of the dampers so that a pitch rate becomes equal to the target pitch rate. In a critical region in which a road-surface gripping state of the vehicle tires is bad, the roll suppression section performs control in priority to the pitch control unit so as to weigh a target damping force calculated in the roll suppression section. As a result, the damping-force characteristic of the dampers is controlled so as to increase the amount of roll suppression control.

15 Claims, 8 Drawing Sheets

(56) References Cited

U.S. PATENT DOCUMENTS

| | | | |
|---|---|---|---|
| 7,747,368 B2 * | 6/2010 | Tomida et al. | 701/38 |
| 7,970,512 B2 * | 6/2011 | Lu et al. | 701/41 |
| 8,240,679 B2 * | 8/2012 | Kajino | 280/5.515 |
| 8,285,449 B2 * | 10/2012 | Iyoda et al. | 701/38 |
| 2007/0156314 A1 | 7/2007 | Tomida | |

* cited by examiner

VEHICLE ATTITUDE CONTROLLER

The present application claims priority under 35 U.S.C. section 119 to Japanese Patent Application No. 2010-216068, filed on Sep. 27, 2010. The entire disclosure of Japanese Patent Application No. 2010-216068, filed on Sep. 27, 2010 including specification, claims, drawings and summary is incorporated herein by reference in its entirety.

BACKGROUND OF THE INVENTION

1. Technical Field

The present invention relates to a vehicle attitude controller suitably used for a vehicle, for example, a four-wheeled automobile.

2. Description of the Related Art

In general, the following vehicle attitude controllers are known. One of the vehicle attitude controllers calculates a lateral acceleration from a steering angle and a vehicle velocity of a vehicle and then differentiates the lateral acceleration to obtain a lateral jerk. A damping force of each suspension for each of front and rear right/left wheels is switched in accordance with the lateral jerk to reduce a roll rate (for example, see Japanese Patent Application Laid-open No. 2007-290650).

Another vehicle attitude controller obtains a target roll angle from a lateral acceleration obtained when a vehicle is running. After calculating a target pitch angle in accordance with the target roll angle, the vehicle attitude controller obtains a difference between the target pitch angle and an actual pitch angle so as to perform feedback control (FB control). In this manner, a target behavior of a vehicle body is realized so as to stabilize a vehicle attitude (for example, see Japanese Patent Application Laid-open No. 2007-170590).

On the other hand, still another vehicle attitude controller determines whether tires are present in a linear region (for example, a region in which a road-surface gripping state is good) or in a non-linear region (for example, a region in which the road-surface gripping state is bad) when the vehicle is running. When it is determined that the tires are present in the non-linear region, a damping-force characteristic is switched to a hard side to improve steering stability (for example, see Japanese Patent Application Laid-open No. 6-288876).

SUMMARY OF THE INVENTION

The related technology described in Japanese Patent Application Laid-open No. 2007-290650 cited above uses logic which pays attention only on a reduction in roll rate. Therefore, when the roll rate and a pitch rate have a low relevance or an unintended pitch rate is generated, a feeling in transient turning is sometimes bad.

According to the related technology described in Japanese Patent Application Laid-open No. 2007-170590, the pitch angle is generated in accordance with the roll angle obtained when the vehicle is running Therefore, it is necessary to perform the control even while the vehicle is making an axle turn. Thus, there is a problem in that ride quality is sometimes degraded by the control with a damping-force variable damper, whereas the vehicle is undesirably decelerated by the control with a brake.

Therefore, the inventors of the present invention examined to control the pitch rate in accordance with the roll rate so as to improve roll feeling. In this case, the improvement of the roll feeling can be realized while the tires are present within the linear region corresponding to a normal-operation region when the vehicle is running. However, if the control described above is continued in a critical region in which the road-surface gripping state of the tires is bad, specifically, in the non-linear region, critical performance is sometimes lowered as described below.

Specifically, the amount of load shift is increased due to an increase in transient roll angle. As a result, equivalent cornering power (CP) of the tires is reduced. Moreover, the amount of roll steer is increased due to increase in suspension stroke to cause the vehicle to understeer. Further, due to the switching of the damping-force characteristic, which ignores the road-hugging properties of the tires, a fluctuation in load is disadvantageously increased.

The present invention has an object to provide a vehicle attitude controller capable of improving turning operability, steering stability, and ride quality when a vehicle is running.

In order to solve the above-mentioned problems, the present invention provides a vehicle attitude controller for controlling an attitude of a vehicle body of a vehicle, including: control means for improving a roll feeling; control means for improving stability; and vehicle-motion determining means, in which: the control means for improving the roll feeling includes: target pitch-rate calculating means for calculating a target pitch rate corresponding to a target value of a pitch rate of the vehicle body so that the pitch rate increases in accordance with a magnitude of a roll rate of the vehicle body; and pitch-moment generating means for generating a pitch moment for the vehicle body so that the pitch rate of the vehicle body becomes closer to the target pitch rate; the control means for improving the stability includes roll suppression means for generating a force for suppressing roll; and the vehicle-motion determining means is configured to switch a control rate between the control means for improving the roll feeling and the control means for improving the stability in accordance with a vehicle motion.

As described above, according to the present invention, ideal coupling between a pitch behavior and a roll behavior can be achieved in a normal-operation region. Therefore, a driver's feeling (roll feeling) while the vehicle is running can be improved. Moreover, in a critical region, running stability can be ensured.

DETAILED DESCRIPTION OF THE PREFERRED EMBODIMENTS

Hereinafter, a vehicle attitude controller according to each embodiment of the present invention is described in detail referring to the accompanying drawings, taking a case where the vehicle attitude controller is used for, for example, a four-wheeled automobile as an example.

Figure 1:
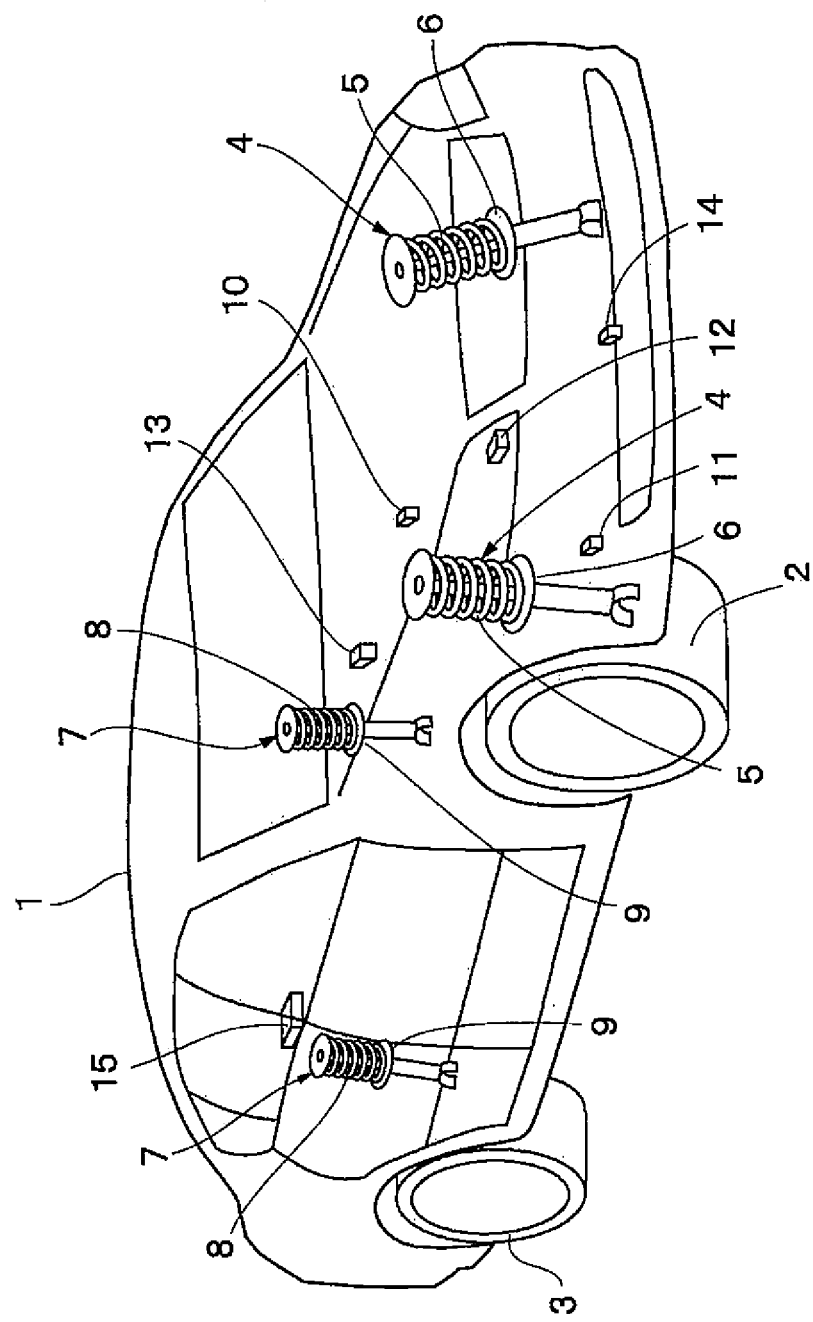
FIG. 1 is a perspective view illustrating a four-wheeled vehicle to which a vehicle attitude controller according to a first embodiment of the present invention is applied.
Figure 2:
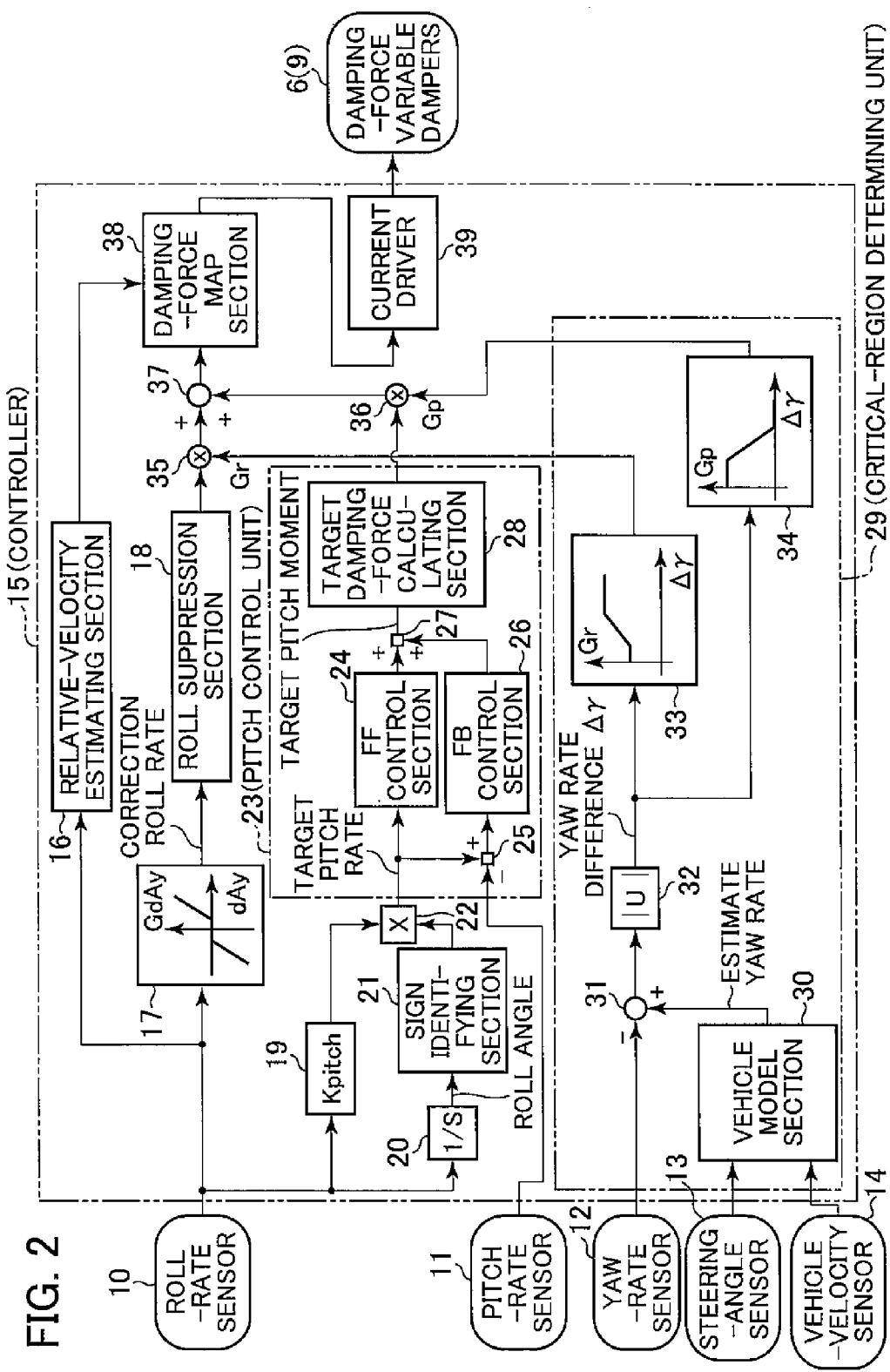
FIG. 2 is a control block diagram illustrating the vehicle attitude controller according to the first embodiment.
Figure 3:
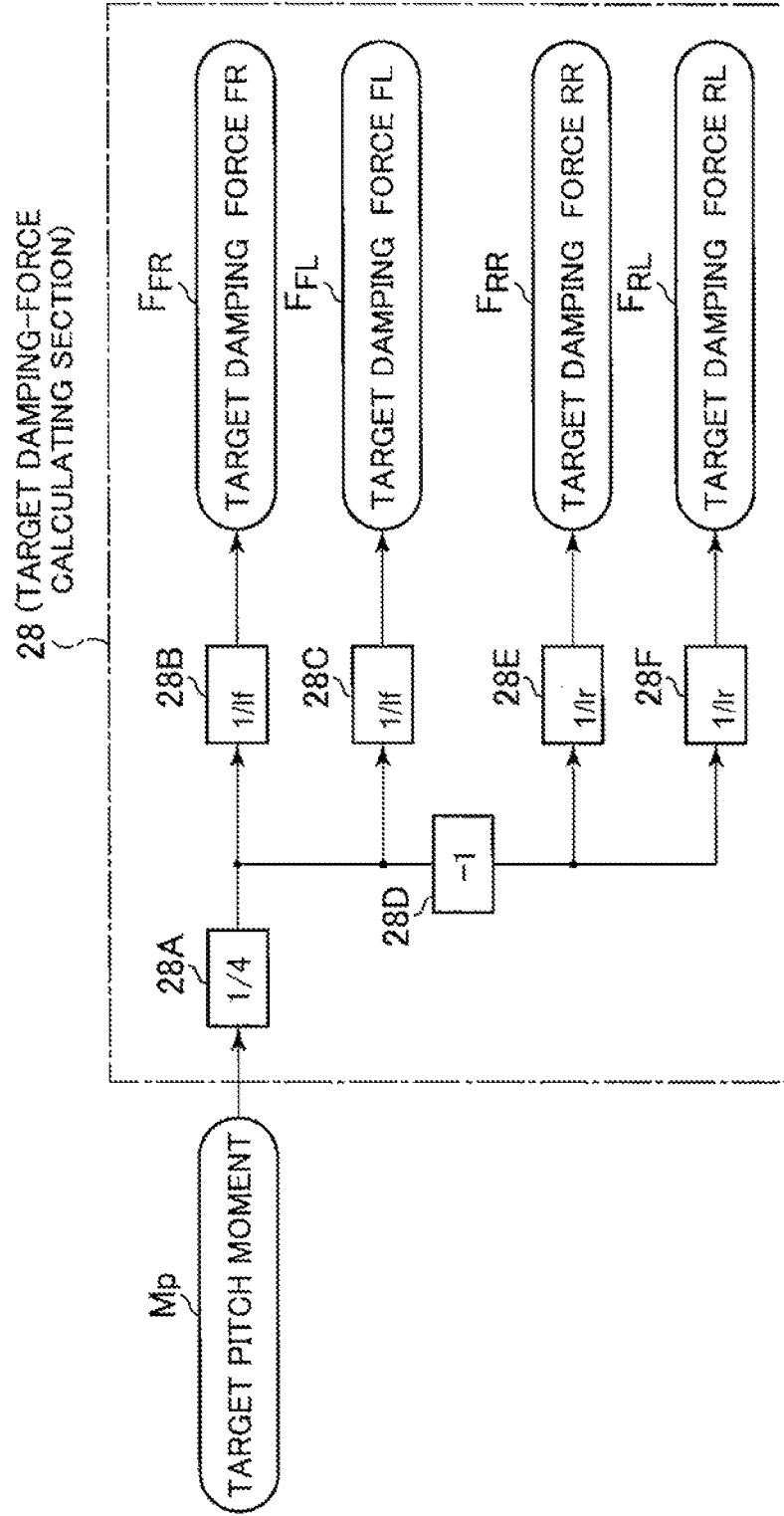
FIG. 3 is a control block diagram illustrating processing for calculating target damping forces for the respective wheels from a pitch moment, which is performed in a target damping-force calculating section illustrated in FIG. 2.

FIGS. 1 to 3 illustrate a first embodiment of the present invention. FIG. 1 illustrates a vehicle body 1 constituting a body of a vehicle. Below the vehicle body 1, for example, front right and left wheels 2 (only one thereof is illustrated) and rear right and left wheels 3 (only one thereof is illustrated) are provided.

Front-wheel side suspension devices 4 are provided between the front right wheel 2 and the vehicle body 1 and between the front left wheel 2 and the vehicle body 1, respectively. One of the front-wheel side suspension devices 4 includes a right suspension spring 5 (hereinafter, referred to simply as "spring 5") and a right damping-force adjusting type shock absorber 6 (hereinafter, referred to as "damping-force variable damper 6") provided between the front right wheel 2 and the vehicle body 1 in parallel to the right spring 5. Similarly, the other front-wheel side suspension device 4 includes a left spring 5 and a left damping-force variable damper 6 provided between the front left wheel 2 and the vehicle body 1 in parallel to the left spring 5. The damping-force variable damper 6 constitutes a part of each of pitch-moment generating means and roll suppression means corresponding to constituent elements of the present invention.

Rear-wheel side suspension devices 7 are provided between the rear left wheel 3 and the vehicle body 1 and between the rear right wheel 3 and the vehicle body 1, respectively. One of the rear-wheel side suspension devices 7 includes a right suspension spring 8 (hereinafter, referred to simply as "spring 8") and a right damping-force adjusting type shock absorber 9 (hereinafter, referred to as "damping-force variable damper 9") provided between the rear left wheel 3 and the vehicle body 1 in parallel to the right spring 8. Similarly, the other rear-wheel side suspension device 7 includes a left spring 8 and a left damping-force variable damper 9 provided between the rear right wheel 3 and the vehicle body 1 in parallel to the left spring 8. The damping-force variable damper 9 constitutes a part of each of the pitch-moment generating means and the roll suppression means.

Each of the damping-force variable dampers 6 and 9 respectively included in the suspension devices 4 and 7 is configured by using a damping-force adjusting type hydraulic shock absorber. Each of the damping-force variable dampers 6 and 9 is provided with an actuator (not shown) including a damping-force adjusting valve, a solenoid, or the like so as to continuously adjust a damping-force characteristic thereof from a hard characteristic to a soft characteristic. The actuator for adjusting the damping force is not necessarily required to be configured to continuously change the damping-force characteristic and may be configured to intermittently change the damping-force characteristic in two, three, or more steps. Any type of damping-force variable damper may be used as each of the damping-force variable dampers 6 and 9 as long as the damping force can be switched, and therefore, a pneumatic damper or an electromagnetic damper may be used.

A roll-rate sensor 10 including a gyroscope or the like, which corresponds to roll-rate detecting means, is provided to the vehicle body 1. The roll-rate sensor 10 detects lateral rolling, which occurs with, for example, a steering operation of the vehicle when the vehicle makes a turn, and outputs a detection signal to a controller 15 described below. The roll-rate detecting means may have any configuration as long as a roll rate can be detected, and therefore may have a configuration for integrating a difference between detection signals of two vertical acceleration sensors provided so as to be horizontally separated away from each other.

A pitch-rate sensor 11 including a gyroscope or the like, which corresponds to pitch-rate detecting means, is provided to the vehicle body 1. The pitch-rate sensor 11 detects longitudinal vibration, which occurs when, for example, the vehicle accelerates/decelerates, and outputs a detection signal to the controller 15 described below. The pitch-rate detecting means may have any configuration as long as a pitch rate can be detected, and therefore may have a configuration for integrating a difference between detection signals of two vertical acceleration sensors provided so as to be longitudinally separated away from each other.

A yaw-rate sensor 12 including a gyroscope or the like, which corresponds to yaw-rate detecting means, is provided to the vehicle body 1. The yaw-rate sensor 12 detects a vibration in a spin direction, which is generated, for example, about the center of gravity of the vehicle, and outputs a detection signal to the controller 15 described below. A single three-dimensional gyroscope may serve as all the roll-rate sensor 10, the pitch-rate sensor 11, and the yaw-rate sensor 12 described above, or may serve as at least two of the three sensors 10, 11, and 12 described above.

A steering-angle sensor 13 is provided to the vehicle body 1. The steering-angle sensor 13 detects a steering angle (corresponding to a front-wheel rudder angle $\delta_f$ described below) when a driver of the vehicle performs a steering operation of a steering wheel to make a turn, and then outputs a detection signal to the controller 15 described below. A vehicle-velocity sensor 14 detects, for example, a running velocity of the vehicle (corresponding to a vehicle velocity V described below), and then outputs a detection signal to the controller 15.

The controller 15 corresponds to control means and includes a microcomputer or the like. As illustrated in FIG. 2, an input side of the controller 15 is connected to the roll-rate sensor 10, the pitch-rate sensor 11, the yaw-rate sensor 12, the steering-angle sensor 13, the vehicle-velocity sensor 14, and the like, whereas an output side thereof is connected to the actuators (not shown) of the damping-force variable dampers 6 and 9 and the like.

As illustrated in FIG. 2, the controller 15 includes a relative-velocity estimating section 16, a roll-rate correcting section 17, a roll suppression section 18, a gain multiplying section 19, an integrating section 20, a sign identifying section 21, a multiplying section 22, a pitch control unit 23, a critical-region determining unit 29, a first weighing-factor multiplying section 35, a second weighing-factor multiplying section 36, an adding section 37, a damping-force map computing section 38, and a current driver 39. The relative-velocity estimating section 16 obtains a vertical extension/compression velocity at each of the damping-force variable dampers 6 and 9 for the respective wheels as a relative velocity by estimation and computation based on the detection signal from the roll-rate sensor 10.

The roll-rate correcting section 17 refers to a non-linear gain map illustrated in FIG. 2 to calculate a correction roll rate for the roll rate detected by the roll rate sensor 10. When a detection value of the roll rate becomes large, the correction roll rate is set large in accordance with the non-linear gain map illustrated in FIG. 2. Then, the roll suppression section 18 multiplies the correction roll rate output from the roll-rate correcting section 17 by a gain (not shown) to calculate a target damping force for each of the damping-force dampers 6 and 9 for the respective wheels so as to perform roll-suppression control.

The pitch control unit 23 included in the controller 15 multiplies the roll rate (for example, a value obtained with a clockwise rotation is set to a positive value) detected by the roll-rate sensor 10 by a gain "Kpitch" in the gain multiplying section 19 so as to perform pitch control for improving a roll feeling. In the sign identifying section 21, a sign (for example, the sign for a right-hand roll is set positive and that for a left-hand roll is set negative) of a roll angle obtained by integrating the roll rate in the integrating section 20. The multiplying section 22 multiplies the sign by the roll rate obtained by the gain multiplying section 19 to calculate a target pitch rate as a correction value so that the vehicle is constantly held in a dive state (with a decreasing pitch) when the roll is increased and the vehicle is constantly held in a squat state (with an increasing pitch) when the roll is reduced.

The gain multiplying section 19, the integrating section 20, the sign identifying section 21, and the multiplying section 22 constitute target pitch-rate calculating means corresponding to a constituent element of the present invention. By the target pitch-rate calculating means, the target pitch rate corresponding to a target value of the pitch rate of the vehicle body 1 is calculated as the correction value so that the pitch rate increases linearly or non-linearly in accordance with the magnitude of the roll rate of the vehicle body 1.

The pitch control unit 23 includes an FF control section 24, a difference computing section 25, an FB control section 26, an adding section 27, and a target damping-force calculating section 28. When the correction value of the target pitch rate is input, the FF control section 24 performs computations in accordance with Formulae 1 to 3 described below so as to calculate a target pitch moment by feedforward control. The difference computing section 25 computes a difference between a signal of the actual pitch rate detected by the pitch-rate sensor 11 and the correction value of the target pitch rate as an error with respect to a target value. The FB control section 26 computes a target pitch moment by feedback control in accordance with the signal from the difference computing section 25 (error with respect to the target value).

The FF control section 24 is a controller which uses an inverse characteristic of a transfer function calculated by modeling a characteristic from the pitch moment to the pitch rate as a secondary vibration model. An equation of motion of a pitch motion is obtained by Formula 1 described below, where Q: pitch angle, $I_x$: pitch inertia, $K_x$: pitch stiffness, $C_x$: pitch damping coefficient, and $M_x$: pitch moment.

$$I_x \times \ddot{Q} = -K_x \times Q - C_x \times \dot{Q} + M_x \quad \text{[Formula 1]}$$

The transfer function from the pitch moment to the pitch rate is obtained by Formula 1 as expressed by Formula 2 described below. As a result, the transfer function from the pitch moment to the pitch rate is obtained as Formula 3 described below.

$$\frac{Q}{M_x} = \frac{s}{I_x \times s^2 + C_x \times s + K_x} \quad \text{[Formula 2]}$$

$$\frac{M_x}{\dot{Q}} = \frac{I_x \times s^2 + C_x \times s + K_x}{s} \quad \text{[Formula 3]}$$

The FB control section 26 may be configured as a PID controller for outputting a target pitch moment in accordance with the error described above or may be configured based on the modern control theory, and therefore is not limited in terms of the control law. The pitch control unit 23 computes the difference between the correction value of the target pitch rate and the actual pitch rate as the error with respect to the target value in the difference computing section 25 as described above. The target pitch moments respectively calculated in the FF control section 24 and the FB control section 26 are added in the adding section 27. Then, the adding section 27 outputs a value obtained by the addition as a target pitch moment to the target damping-force calculating section 28.

Specifically, the adding section 27 included in the pitch control unit 23 adds the target pitch moment calculated in the FF control section 24 and the target pitch moment calculated in the FB control section 26, and then outputs the value obtained by the addition as a target pitch moment Mp to the target damping-force calculating section 28 in a subsequent stage. By inputting the target pitch moment at this time, the target damping-force calculating section 28 included in the pitch control unit 23 calculates a target damping force by pitch control for improving the roll feeling on the vehicle body 1 side.

When the target pitch moment Mp is input as illustrated in FIG. 3, the target damping-force calculating section 28 computes target damping forces for the respective wheels (specifically, the front right and left wheels 2 and the rear right and left wheels 3) in a distributed manner in accordance with the input target pitch moment Mp. Specifically, in a block 28A of the target damping-force calculating section 28, the target pitch moment Mp is divided into four so as to equally distribute the target pitch moment Mp to the wheels. In a next block 28B, a moment (Mp/4) obtained by the equidistribution is divided by a distance lf to a center of gravity on the side of the front wheels 2 so as to calculate a target damping force $F_{FR}$ for the front right wheel 2. In a block 28C, the moment (Mp/4) obtained by the equidistribution is divided by the distance lf to the center of gravity on the side of the front wheels 2 so as to calculate a target damping force $F_{FL}$ for the front left wheel 2.

On the other hand, in a block 28D of the target damping-force calculating section 28, the moment obtained by the equidistribution is multiplied by "−1" so that a direction of the target damping force on the side of the rear wheels 3 is set opposite to that on the side of the front wheels 2. In a next block 28E, the moment (Mp/4) obtained by the equidistribution, which has been multiplied by "−1", is divided by a distance lr to a center of gravity on the side of the rear wheels 3 so as to calculate a target damping force $F_{RR}$ for the rear right wheel 3. In a block 28F, the moment (Mp/4) obtained by the equidistribution, which has been multiplied by "−1", is divided by the distance lr to the center of gravity on the side of the rear wheels 3 so as to calculate a target damping force $F_{RL}$ for the rear left wheel 3.

Next, the critical-region determining unit 29 corresponding to tire critical-state determining means of the present invention, for determining whether or not tires have reached a critical region (non-linear region) from a normal-operation region (linear region) while the vehicle is running is described. The critical-region determining unit 29 includes a vehicle model section 30, a deviation computing section 31, an absolute-value computing section 32, a first map computing section 33, and a second map computing section 34. The critical-region determining unit 29 constitutes vehicle-motion determining means corresponding to a constituent element of the present invention.

In this case, the vehicle model section 30 of the critical-region determining unit 29 obtains a yaw rate γ of a linear vehicle model by estimation and computation in accordance with Formula 4 described below based on the signal of the steering angle (front-wheel rudder angle δf) detected by the steering-angle sensor 13 and the signal of the vehicle velocity V detected by the vehicle-velocity sensor 14. In Formula 4, V is the vehicle velocity (m/s), A is a stability factor ($S^2/m^2$), δf is the front-wheel rudder angle (rad), and L is a wheel base (m).

$$\gamma = \frac{1}{1 + A \times V^2} \times \frac{V}{L} \times \delta_f \quad [\text{Formula 4}]$$

The deviation computing section 31 computes a difference between the actual yaw rate actually detected by the yaw-rate sensor 12 and the yaw rate γ obtained by the estimation and computation in the vehicle model section 30, and then calculates an absolute value of the difference as a yaw rate difference Δγ in the absolute-value computing section 32. The first map computing section 33 obtains a first weighing factor Gr by a map computation based on the yaw rate difference Δγ. As illustrated in FIG. 2, the first weighing factor Gr is set to a value, for example, smaller than "1" when the yaw rate difference Δγ is small and is gradually increased when the yaw rate difference Δγ becomes large and is set to, for example, to "1" or a value larger than "1".

The second map computing section 34 obtains a second weighing factor Gp by a map computation based on the yaw rate difference Δγ. The second weighing factor Gp is set to, for example, "1" or a value larger than "1" when the yaw rate difference Δγ is small and is gradually reduced when the yaw rate difference Δγ becomes large, and is set to, for example, to "0" or a value close to "0". Specifically, when the first weighing factor Gr gradually increases, the second weighing factor Gp is gradually reduced to be set to a value closer to "0" in contrast to the first weighing factor Gp. When the first weighing factor Gr gradually reduces, the second weighing factor Gp is set to, for example, "1" or a value larger than "1".

In this manner, the critical-region determining unit 29 determines that the tires of the vehicle which is running approach the non-linear region, specifically, the critical region, from the normal-operation region (linear region), when the yaw rate difference Δγ corresponding to the deviation between the yaw rate γ obtained by the estimation computation in the vehicle model section 30 and the actual yaw rate becomes large. In this case, the first weighing factor Gr is increased so that control of the roll suppression section 18 is weighed, whereas the second weighing factor Gp is reduced to "0" or to become closer to "0" so that the control of the pitch control unit 23 is made relatively small.

The first weighing-factor multiplying section 35 multiplies the target damping force for performing roll-suppression control (control for improving stability), which is output from the roll suppression section 18 to each of the damping-force variable dampers 6 and 9 for the respective wheels, by the first weighing factor Gr so as to weigh the target damping force for improving the stability. The second weighing-factor multiplying section 36 multiplies the target damping force for performing pitch control (control for improving the roll feeling), which is output from the pitch control unit 23 to each of the damping-force variable dampers 6 and 9 for the respective wheels, by the second weighing factor Gp so as to weigh the target damping force for improving the roll feeling.

As described above, the critical-region determining unit 29 constituting the vehicle-motion determining means calculates the difference between the yaw rate estimated in the vehicle model section 30 and the actual yaw rate as the yaw rate difference Δγ, and inputs the yaw rate difference Δγ to the first map computing section 33 and the second map computing section 34, each being for calculating the weight of each control, to obtain the first weighing factor Gr and the second weighing factor Gp. In the first weighing-factor multiplying section 35, the target damping force calculated in the roll suppression section 18 is multiplied by the first weighing factor Gr so as to calculate a first target damping force corrected in accordance with the critical region of the tires or the like. At the same time, in the second weighing-factor multiplying section 36, the target damping force calculated in the pitch control unit 23 is multiplied by the second weighing factor Gp so as to calculate a second target damping force similarly corrected in accordance with the critical region. As a result, a control rate between the first target damping force (control for improving stability) and the second target damping force (control for improving the roll feeling) is switched.

The adding section 37 adds the target damping force obtained by the first weighing-factor multiplying section 35, which is weighed to be corrected in accordance with the critical region of the tires as described above, and the target damping force obtained by the second weighing-factor multiplying section 36, which is weighted to be corrected in accordance with the critical region of the tires, and outputs the result of addition as a final target damping force to the damping-force map computing section 38. The damping-force map computing section 38 calculates a command value of a control current by a map computation from a prestored damper characteristic map in accordance with the target damping force calculated as described above and the relative velocity of each of the damping-force variable dampers 6 and 9 obtained by the relative-velocity estimating section 16.

Next, the current driver 39 controls the current value corresponding to the target damping force to be output to the actuator of each of the damping-force variable dampers 6 and 9 based on the command value of the current, which is output from the damping-force map computing section 38. Then, the damping-force characteristic of each of the damping-force variable dampers 6 and 9 for the respective wheels (the front right and left wheels 2 and the rear right and left wheels 3) is variably controlled continuously or in a plurality of steps between the hard characteristic and the soft characteristic in accordance with the current value (current command value) fed to the actuator.

The damping-force variable dampers 6 and 9 for the respective wheels constitute control means for improving stability corresponding to a constituent element of the present invention, with, for example, the roll-rate correcting section 17, the roll suppression section 18, the first weighing-factor multiplying section 35, the adding section 37, the target damping-force calculating section 28, and the current driver 39, which are illustrated in FIG. 2. Moreover, the damping-force variable dampers 6 and 9 for the respective wheels (the front right and left wheels 2 and the rear right and left wheels 3) constitute pitch-moment generating means of control means for improving a roll feeling corresponding to a constituent element of the present invention, with, for example, the pitch control unit 23, the second weighing-factor multiplying section 36, the adding section 37, the damping-force map computing section 38, and the current driver 39, which are illustrated in FIG. 2.

The vehicle attitude controller according to this embodiment has the configuration as described above. Next, an attitude control operation for the vehicle body 1, which is performed by the controller 15, is described below.

The control means for improving stability of the vehicle includes the damping-force variable dampers 6 and 9 for the respective wheels (the front right and left wheels 2 and the rear right and left wheels 3), and the roll-rate correcting section 17, the roll suppression section 18, the first weighing-factor multiplying section 35, the adding section 37, the target damping-force calculating section 28, and the current driver 39, which are included in the controller 15. The control means for improving stability calculates a correction roll rate for the roll rate detected by the roll-rate sensor 10 in the roll-rate correcting section 17 and calculates the target damping force for each of the damping-force variable dampers 6 and 9 for the respective wheels based on the correction roll rate so as to perform the roll-suppression control in the roll suppression section 18.

The target pitch-rate calculating means includes the gain multiplying section 19, the integrating section 20, the sign identifying section 21, and the multiplying section 22, which are included in the controller 15. The target pitch-rate calculating means calculates the target pitch rate corresponding to a target value of the pitch rate of the vehicle body 1 so that the pitch rate increases linearly or non-linearly in accordance with the magnitude of the roll rate of the vehicle body 1. Then, the pitch control unit 23 calculates the target damping force by the pitch control for improving the roll feeling on the vehicle body 1 side. As a result, the damping-force characteristic of each of the damping-force variable dampers 6 and 9 for the respective wheels (the front right and left wheels 2 and the rear right and left wheels 3) is variably controlled so that the pitch rate becomes equal to the target pitch rate. The control for generating the pitch moment for improving the roll feeling is performed for the vehicle body 1.

On the other hand, the critical-region determining unit 29 calculates the difference between the yaw rate estimated by the vehicle model section 30 and the actual yaw rate as the yaw rate difference Δγ so as to perform the control for determining the critical state of the vehicle based on the yaw rate difference Δγ. Specifically, the yaw rate difference Δγ is input to the first map computing section 33 and the second map computing section 34 to obtain the first weighing factor Gr and the second weighing factor Gp. In the first weighing-factor multiplying section 35, the target damping force calculated in the roll suppression section 18 is multiplied by the first weighing factor Gr to calculate the first target damping force corrected in accordance with the critical region of the tires. In the second weighing-factor multiplying section 36, the target damping force calculated in the pitch control unit 23 is multiplied by the second weighing factor Gp so as to calculate the second target damping force corrected in accordance with the critical region in the similar manner as that for the first target damping force.

In this manner, while the tires are present in the linear region corresponding to the normal-operation region when the vehicle runs, the control of the pitch control unit 23, for calculating the target pitch rate in accordance with the roll rate, is preferentially performed. By variably controlling the target damping force for each wheel so that the pitch rate becomes equal to the target pitch rate, the roll rate and the pitch rate can have a proportional relation. As a result, the vehicle attitude in smooth cornering, that is, the vehicle enters a corner in a dive state and exits the corner in a squat state, can be obtained. As a result, the roll feeling is improved.

On the other hand, in the critical region (specifically, the non-linear region) in which the road-surface gripping state of the tires is bad, the second weighing factor Gp is computed by the second weighing-factor multiplying section 36 so as to be equal to or closer to "0". Then, the target damping force calculated in the pitch control unit 23 is corrected with the second weighing factor Gp so as to be reduced. In this manner, the target damping force calculated in the roll suppression section 18 is weighed so as to increase the amount of roll-suppression control. As a result, the damping force can be generated so as to suppress the roll in proportion to the roll rate. The roll suppression can be positively performed so as to improve the stability of the vehicle.

As described above, according to the first embodiment, the control is performed so as to preferentially improve the roll feeling while the tires are in the normal-operation region when the vehicle runs, whereas the control is performed so as to preferentially suppress the roll, placing importance on the stability of the vehicle rather than on the roll feeling while the tires are present in the critical region. In this manner, optimal control is performed in accordance with operating conditions of the vehicle. As a result, the stability of the vehicle body 1 in the critical region, which has conventionally been a problem, can be improved. Moreover, the pitch behavior and the roll behavior can be provided with an ideal relevance in the normal-operation region. As a result, a driver's feeling (roll feeling) while the vehicle is running can be improved.

As described above, the improvement of the roll feeling and the improvement of the stability can be realized in an appropriately switched manner in accordance with the vehicle conditions. As a result, the ride quality and the steering stability of the vehicle can be both enhanced. The roll feeling on the vehicle body 1 side can be improved in the normal-operation region, whereas the control placing importance on the stability can be performed in the critical region. Therefore, both the performances can be realized. Moreover, the control in this case is configured so as to increase the gain or the input signal of the existing logic instead of switching the logic. In this manner, both the performances can be realized. Thus, discontinuous switching in the middle of the control is not performed, and hence smooth control can be realized.

In the first embodiment described above, the case where the roll rate is detected by the roll-rate sensor 10 and the pitch rate is detected by the pitch-rate sensor 11 has been described as an example. However, the present invention is not limited thereto. For example, the roll rate and the pitch rate may be calculated by using, for example, a vertical acceleration sensor mounted to the vehicle body. Moreover, the relative velocity of the damper may be obtained from a differential value of the vehicle-height sensor. Alternatively, a relative acceleration may be calculated from detection values of vertical acceleration sensors respectively mounted to an unsprung side and a sprung side so that the relative velocity of the damper may be calculated by integrating the relative acceleration. Therefore, a calculation method is not particularly required to be limited.

Figure 4:
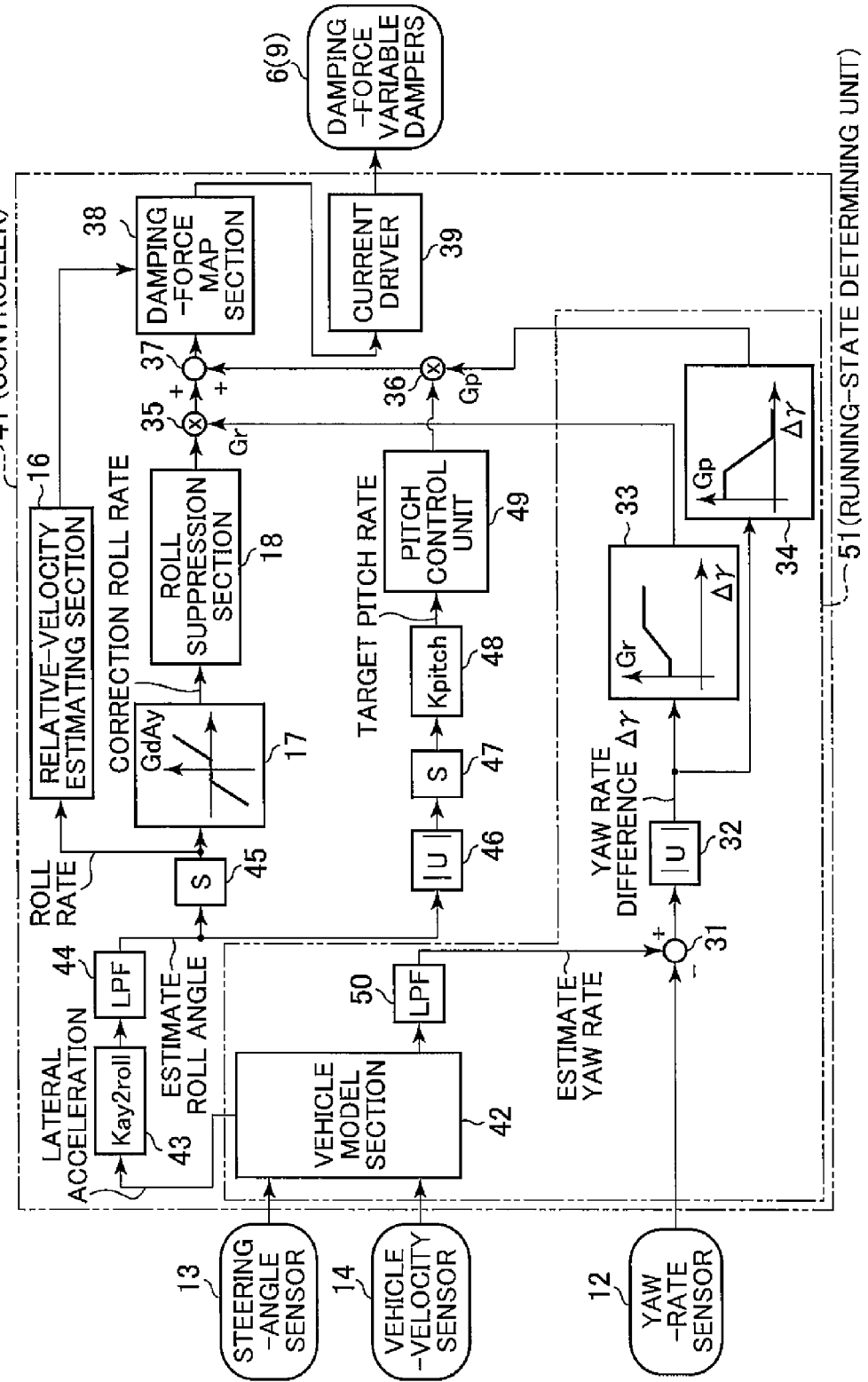
FIG. 4 is a control block diagram illustrating a vehicle attitude controller according to a second embodiment.

Next, FIG. 4 illustrates a second embodiment of the present invention. The second embodiment has a feature that a lateral acceleration and the yaw rate are calculated from the steering angle and the vehicle velocity by using a vehicle model so as to control the vehicle attitude without using the roll-rate sensor and the pitch-rate sensor. In the second embodiment, the same components as those of the first embodiment described above are denoted by the same reference numerals, and the description thereof is omitted.

As illustrated in FIG. 2, a controller 41 is provided as control means used in the second embodiment. An input side of the controller 41 is connected to the yaw-rate sensor 12, the steering-angle sensor 13, and the vehicle-velocity sensor 14, whereas an output side thereof is connected to the actuators (not shown) of the damping-force variable dampers 6 provided on the front right wheel 2 side and the front left wheel 2 side and the damping-force variable dampers 9 provided on the rear right wheel 3 side and the rear left wheel 3 side.

As illustrated in FIG. 4, the controller 41 includes a vehicle model section 42, a roll gain multiplying section 43, a first filter section 44, a first differentiating section 45, an absolute-value computing section 46, a second differentiating section 47, a pitch gain multiplying section 48, a pitch control unit 49, and a second filter section 50. Moreover, similarly to the controller 15 described in the first embodiment, the controller 41 includes the relative-velocity estimating section 16, the roll-rate correcting section 17, the roll suppression section 18, the deviation computing unit 31, the absolute-value computing unit 32, the first map computing section 33, the second map computing section 34, the first weighing-factor multiplying section 35, the second weighing-factor multiplying section 36, the adding section 37, the damping-force map computing section 38, and the current driver 39.

In this case, together with the second filter section 50, the deviation computing unit 31, the absolute-value computing unit 32, the first map computing section 33, and the second map computing section 34, the vehicle model section 42 constitutes a running-state determining unit 51. The running-state determining unit 51 constitutes the vehicle-motion determining means corresponding to a constituent element of the present invention.

The controller 41 estimates and computes a lateral acceleration αy in the vehicle model section 42 in the following manner based on the signal of the steering angle detected by the steering-angle sensor 13 and the signal of the vehicle velocity detected by the vehicle-velocity sensor 14. The lateral acceleration αy can be obtained in accordance with Formula 5 if a linear model of the vehicle is supposed and dynamic characteristics are ignored. In Formula 5, V is the vehicle velocity (m/s), A is the stability factor ($S^2/m^2$), δf is the front-wheel rudder angle (rad), and L is the wheel base (m).

$$\alpha y = \frac{1}{1 + A \times V^2} \times \frac{V^2}{L} \times \delta_f \quad \text{[Formula 5]}$$

In the roll gain multiplying section 43, the thus calculated lateral acceleration αy is multiplied by a predetermined gain "Kay2roll" [deg/(m/s$^2$)] to calculate a roll angle. The gain in this case is obtained by setting a relation of the roll angle with respect to the lateral acceleration αy (roll angle/lateral acceleration gain). However, a signal of the roll angle output from the gain multiplying section 43 ignores the dynamic characteristic from the start of steering of the steering wheel to the generation of the roll angle in the vehicle body 1. Therefore, the first filter section 44 reproduces dynamics by a lowpass filter "LPF" approximating the dynamic characteristics in this case.

Similarly to the vehicle model section 30 described in the first embodiment, the vehicle model section 42 estimates and computes a yaw rate γ of the linear vehicle model in accordance with Formula 4 given above based on the detection signals from the steering-angle sensor 13 and the vehicle-velocity sensor 14. The second filter section 50 uses the lowpass filter "LPF" to approximate the dynamic characteristics of the estimate yaw rate because the signal (yaw rate) output from the vehicle model section 42 is in the form ignoring the dynamic characteristics.

Next, the first differentiating section 45 differentiates the estimate roll angle output from the first filter section 44 to calculate the roll rate. When the roll rate calculated in the first differentiating section 45 is large, a steering velocity is high. Therefore, there is a high possibility of occurrence of rollover. Accordingly, the roll-rate correcting section 17 uses a non-linear gain for increasing an apparent roll rate to calculate a correction roll rate, placing importance on the stability when the calculated value (roll rate) is large. Then, the roll suppression section 18 calculates the target damping force for each wheel based on the correction roll rate so as to suppress the roll on the vehicle body 1 side.

Subsequently, an absolute value of the estimate roll angle is first obtained in the absolute-value computing section 46 and is then differentiated in the second differentiating section 47. Thereafter, the differentiated absolute value of the estimate roll angle is multiplied by a gain "Kpitch" to calculate the target pitch rate. The pitch control unit 49 for improving the roll feeling calculates a target damping force for each wheel, which is required for generating the target pitch rate, from the calculated target pitch rate by the FF control in consideration of the dynamics in a pitch direction.

Next, the running-state determining unit 51 including the vehicle model section 42, the second filter section 50, the deviation computing section 31, the absolute-value computing section 32, the first map computing section 33, and the second map computing section 33 inputs the yaw rate difference Δγ obtained in the deviation computing section 31 and the absolute-value computing section 32 to the first map computing section 33 and the second map computing section 34 to obtain the first weighing factor Gr and the second weighing factor Gp, as in the case of the critical-region determining unit 29 described in the first embodiment.

Then, in the first weighing-factor multiplying section 35, the target damping force calculated in the roll suppression section 18 is multiplied by the first weighing factor Gr to calculate the first target damping force corrected in accordance with the critical region of the tires. In the second weighing-factor multiplying section 36, the target damping force calculated in the pitch control unit 49 is multiplied by the second weighing factor Gp to calculate the second target damping force corrected in accordance with the critical region of the tires similarly to the first target damping force. In this manner, a control amount of the roll-suppression control and a control amount of the pitch control are adjusted in accordance with the yaw rate difference Δγ.

In the relative-velocity estimating section 16, the relative velocity of each wheel is estimated from the roll rate calculated in the differentiating unit 45 and vehicle data by using a geometric relation. In the adding section 37, the thus calculated roll-suppression control amount and pitch control amount are added to calculate the target damping force for each wheel. Based on the target damping force and the estimated relative velocity, the damping-force map computing section 38 calculates the command current value from the pre-stored damping-force characteristic (damping-force, current value, relative velocity). The current driver 39 outputs a current corresponding to the computed current value to the actuator of each of the damping-force variable dampers 6 and 9 so as to variably control the damping-force characteristic of each of the damping-force variable dampers 6 and 9.

In the manner described above, as in the case of the first embodiment, even in the second embodiment configured as described above, the roll feeling and the stability are appropriately improved in accordance with the vehicle conditions to enable the ride quality and the steering stability of the vehicle to be both enhanced. In the second embodiment, in particular, the attitude of the vehicle body 1 can be controlled based only on the detection signals from the yaw-rate sensor 12, the steering-angle sensor 13, and the vehicle-velocity sensor 14 without using the roll-rate sensor or the pitch-rate sensor.

In this manner, the number of sensors to be used can be reduced to reduce cost, which can in turn simplify the system. Further, the control is performed with the command currents to the damping-force variable dampers 6 and 9, which are computed in the controller 41 based on the signal detected by the yaw-rate sensor 12. Therefore, the improvement of the roll feeling and the improvement of stability in the critical region can be both realized.

Figure 5:
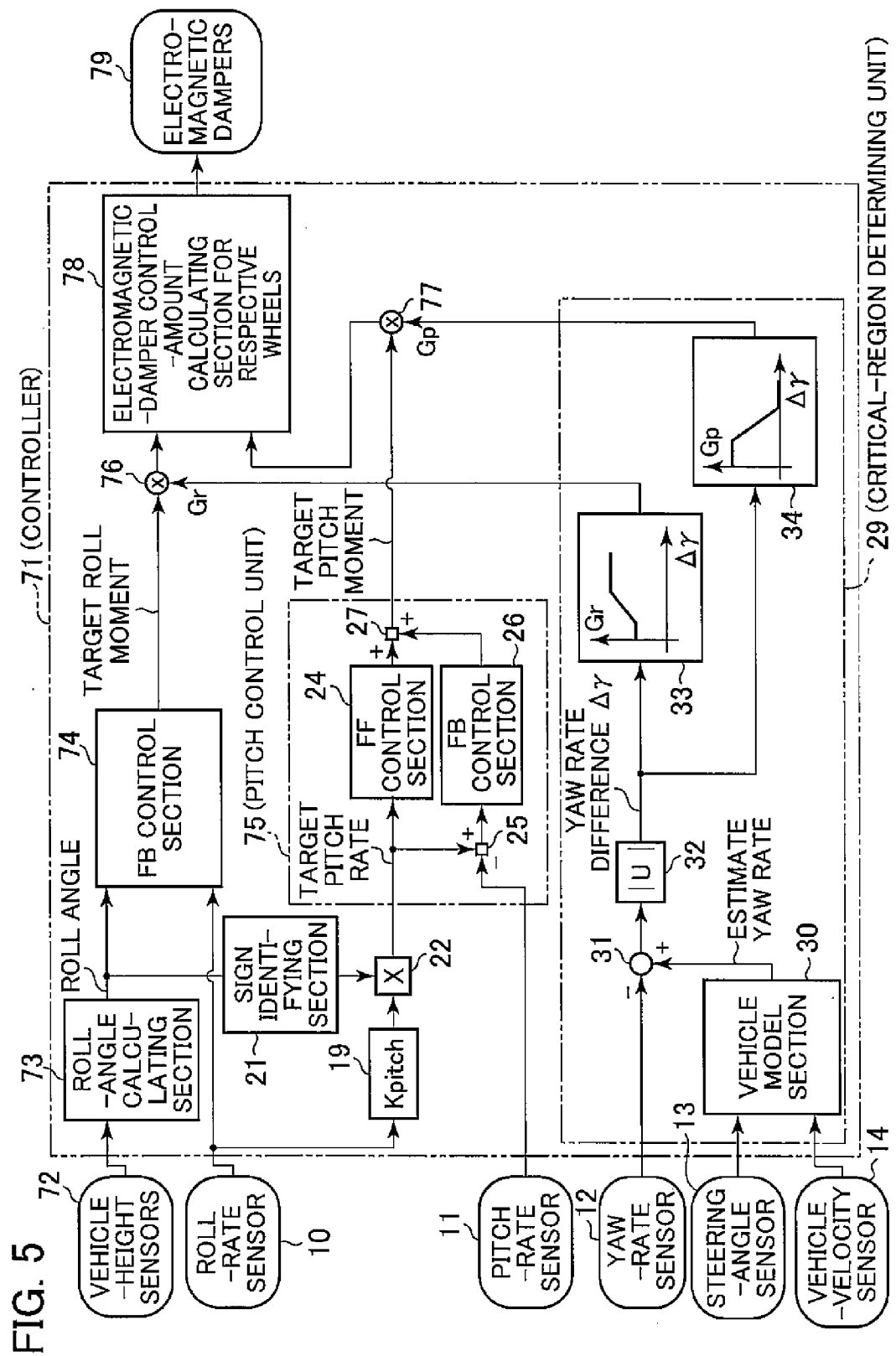
FIG. 5 is a control block diagram illustrating a vehicle attitude controller according to a third embodiment.
Figure 6:
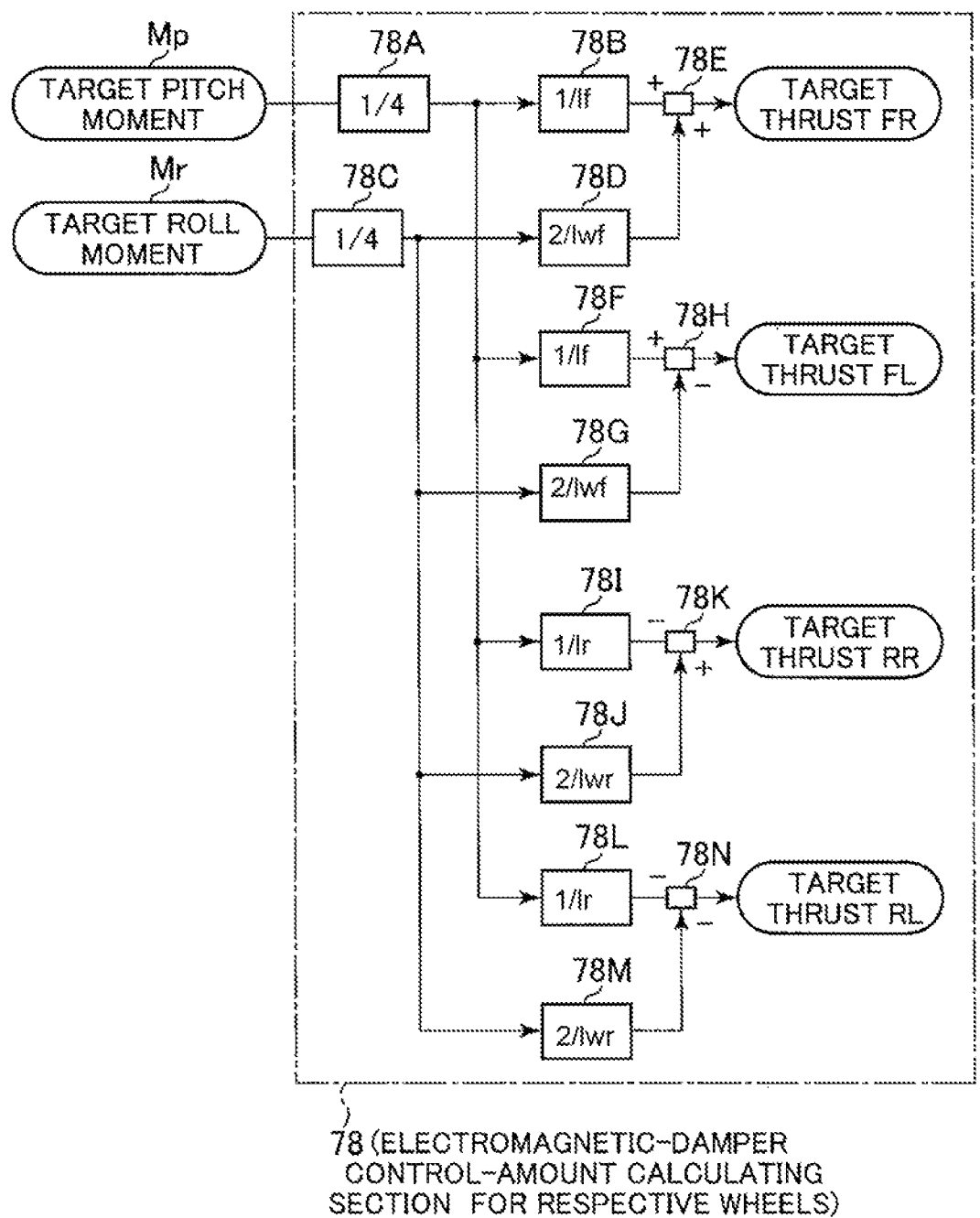
FIG. 6 is a control block diagram illustrating processing for calculating a target thrust for each wheel from a target pitch moment and a target roll moment, which is performed in an electromagnetic-damper control-amount calculating section illustrated in FIG. 5.

Next, FIGS. 5 and 6 illustrate a third embodiment of the present invention. The third embodiment has a feature that an active suspension capable of generating a thrust by itself is used in place of a semi-active suspension (for example, the damping-force adjusting type shock absorber) as the actuator for controlling the vehicle attitude. In the third embodiment, the same components as those of the first embodiment described above are denoted by the same reference numerals, and the description thereof is omitted.

FIG. 5 illustrates a controller 71 as control means used in this embodiment. The controller 71 is configured substantially similarly to the controller 15 described in the first embodiment. An input side of the controller 71 is connected to the roll-rate sensor 10, the pitch-rate sensor 11, the yaw-rate sensor 12, the steering-angle sensor 13, and the vehicle-velocity sensor 14. Further, a plurality of vehicle-height sensors 72 are connected to the input side of the controller 17. The vehicle-height sensors 72 individually detect a vehicle height on the front right wheel 2 side, the front left wheel 2 side, the rear right wheel 3 side, and the rear left wheel 3 side, respectively.

The controller 71 in this embodiment differs from the controller of the first embodiment in that an output side of the controller 71 is connected to active suspensions (electromagnetic dampers 79 described below), each being capable of generating a thrust by itself. The controller 71 includes a roll-angle calculating section 73, an FB control section 74, the gain multiplying section 19, the sign identifying section 21, the multiplying section 22, a pitch control unit 75, the critical-region determining unit 29, a first weighing-factor multiplying section 76, a second weighing-factor multiplying section 77, and an electromagnetic-damper control-amount calculating section 78 for the respective wheels. Among the above-mentioned sections, the gain multiplying section 19, the sign identifying section 21, the multiplying section 22, and the critical-region determining unit 29 are configured in the same manner as those of the first embodiment.

The plurality of (four) electromagnetic dampers 79 are provided for the respective wheels of the vehicle. Each of the electromagnetic dampers 79 is configured by each of the active suspensions provided, for example, on the front right wheel 2 side, the front left wheel 2 side, the rear right wheel 3 side, and the rear left wheel 3 side, respectively. Each of the electromagnetic dampers 79 generates a thrust for vertically lifting up and down the vehicle body 1 on the side of the corresponding wheel in response to a control signal from the electromagnetic-damper control-amount calculating section 78 for the respective wheels.

The roll-angle calculating section 73 of the controller 71 obtains a roll angle of the vehicle body 1 by a computation based on vehicle-height signals from the respective vehicle-height sensors 72. The FB control section 74, which performs feedback control, calculates a target roll moment for performing the roll-suppression control based on the roll rate from the roll-rate sensor 10 and the roll angle obtained by the roll-angle calculating section 73, and then outputs the calculated target roll moment to the first weighing-factor multiplying section 76.

The pitch control unit 75 of the controller 71 includes the FF control section 74, the difference computing section 25, the FB control section 26, and the adding section 27, substantially similarly to the pitch control unit 23 described in the first embodiment. The pitch control unit 75 adds, in the adding section 27, a target pitch moment calculated in the FF control section 24 and a target pitch moment calculated in the FB control section 26, and then outputs the result of addition to the second weighing-factor multiplying section 77 as a target pitch moment for improving the roll feeling.

The first weighing-factor multiplying section 76 multiplies the target roll moment for the roll-suppression control (control for improving the stability) to be output from the FB control section 74 to the electromagnetic-damper control-amount calculating section 78 for the respective wheels by the first weighing factor Gr output from the first map computing section 33 so as to weigh the target roll moment for improving the stability. The second weighing-factor multiplying section 77 multiplies the target pitch moment for pitch control (control for improving the roll feeling) to be output from the pitch control unit 75 to the electromagnetic-damper control-amount calculating section 78 for the respective wheels by the second weighing factor Gp output from the second map computing section 34 so as to weigh the target pitch moment for improving the roll feeling.

Next, the electromagnetic-damper control-amount calculating section 78 for the respective wheels includes blocks 78A to 78N as illustrated in FIG. 6. The electromagnetic-damper control-amount calculating section 78 for the respective wheels executes a computation for distributing the target pitch moment and the target roll moment to the respective wheels (specifically, the front right and left wheels 2 and the rear right and left wheels 3). Specifically, the electromagnetic-damper control-amount calculating section 78 for the respective wheels calculates electromagnetic-damper control amounts so that target thrusts FR, RL, RR, and RL corresponding to the target pitch moments and the target roll moments distributed to the respective wheels can be generated by the electromagnetic dampers 79 for the respective wheels, and then individually outputs control signals for the calculated control amounts (target thrusts FR, FL, RR, and RL) to the corresponding electromagnetic dampers 79.

In the block 78A of the electromagnetic-damper control-amount calculating section 78, the target pitch moment Mp is divided into four so that the four pitch moments obtained by the division are equally distributed to the respective wheels. In the subsequent block 78B, one of the pitch moments (Mp/4) obtained by the equidistribution is divided by the distance lf to the center of gravity on the front right wheel 2 side. In the block 78C, the target roll moment Mr is divided into four so that the four roll moments obtained by the division are equally distributed to the respective wheels. In the subsequent block 78D, one of the equal roll moments (Mr/4) obtained by the equidistribution is divided by a half of a tread (lwf/2). Then, a computing section 78E adds an output value (Mp/4lf) from the block 78B and an output value (Mr/2lwf) output from the block 78D to obtain the target thrust FR on the front right wheel 2 side.

In the subsequent block 78F, one of the equal pitch moments (Mp/4) obtained by the equidistribution is divided by the distance lf to the center of gravity on the front left wheel 2 side. In the block 78G, one of the equal roll moments (Mr/4) obtained by the equidistribution is divided by the half of the tread (lwf/2). Then, a computing section 78H subtracts an output value (Mr/2lwf) from the block 78G from an output value (Mp/4lf) from the block 78F to obtain the target thrust FL on the front left wheel 2 side.

On the other hand, in the subsequent block 78I of the electromagnetic-damper control-amount calculating section 78, one of the pitch moments (Mp/4) obtained by the equidistribution is divided by the distance lr to the center of gravity on the rear right wheel 3 side. In the subsequent block 78J, one of the equal roll moments (Mr/4) obtained by the equidistribution is divided by a half of a tread (lwr/2). Then, a computing section 78K subtracts an output value (Mp/4lr) from the block 78I from an output value (Mr/2lwr) output from the block 78J to obtain the target thrust RR on the rear right wheel 3 side.

In the subsequent block 78L, one of the equal pitch moments (Mp/4) obtained by the equidistribution is divided by the distance lr to the center of gravity on the rear left wheel 3 side. In the block 78M, one of the equal roll moments (Mr/4) obtained by the equidistribution is divided by the half of the tread (lwr/2). Then, a computing section 78N adds an output value (Mp/4lr) from the block 78L and an output value (Mr/2lwr) from the block 78M and sets a sign of the value obtained by the addition to negative (minus) to obtain the target thrust RL on the rear left wheel 3 side.

In the above-mentioned manner, even in the third embodiment configured as described above, the target roll moment is weighed in the first weighing-factor multiplying section 76, whereas the target pitch moment is weighed in the second weighing-factor multiplying section 77. As a result, as in the first embodiment, the roll feeling and the stability can be appropriately improved in accordance with the vehicle conditions. Therefore, the ride quality and the steering stability of the vehicle can be both enhanced.

In the third embodiment, in particular, the target thrusts FR, FL, RR, and RL for the respective wheels are calculated in the electromagnetic-damper control-amount calculating section 78 so that the electromagnetic dampers 79 (active suspensions) generate the thrusts in accordance with the target values. As a result, the pitch rate proportional to the roll rate can be generated. Therefore, a rotation axis of the vehicle body 1 can be stabilized to improve the roll feeling. In addition, the stability can also be improved.

In the third embodiment, the case where the target roll moment is equally distributed to the respective wheels in the block 78A of the electromagnetic-damper control-amount calculating section 78 illustrated in FIG. 6 and the target pitch moment is equally distributed to the respective wheels in the block 78C of the electromagnetic-damper control-amount calculating section 78 illustrated in FIG. 6 has been described as an example. However, the present invention is not limited thereto. For example, the control amounts for the respective wheels may be obtained by, for example, satisfying an equilibrium equation of the roll moment and the pitch moment.

Figure 7:
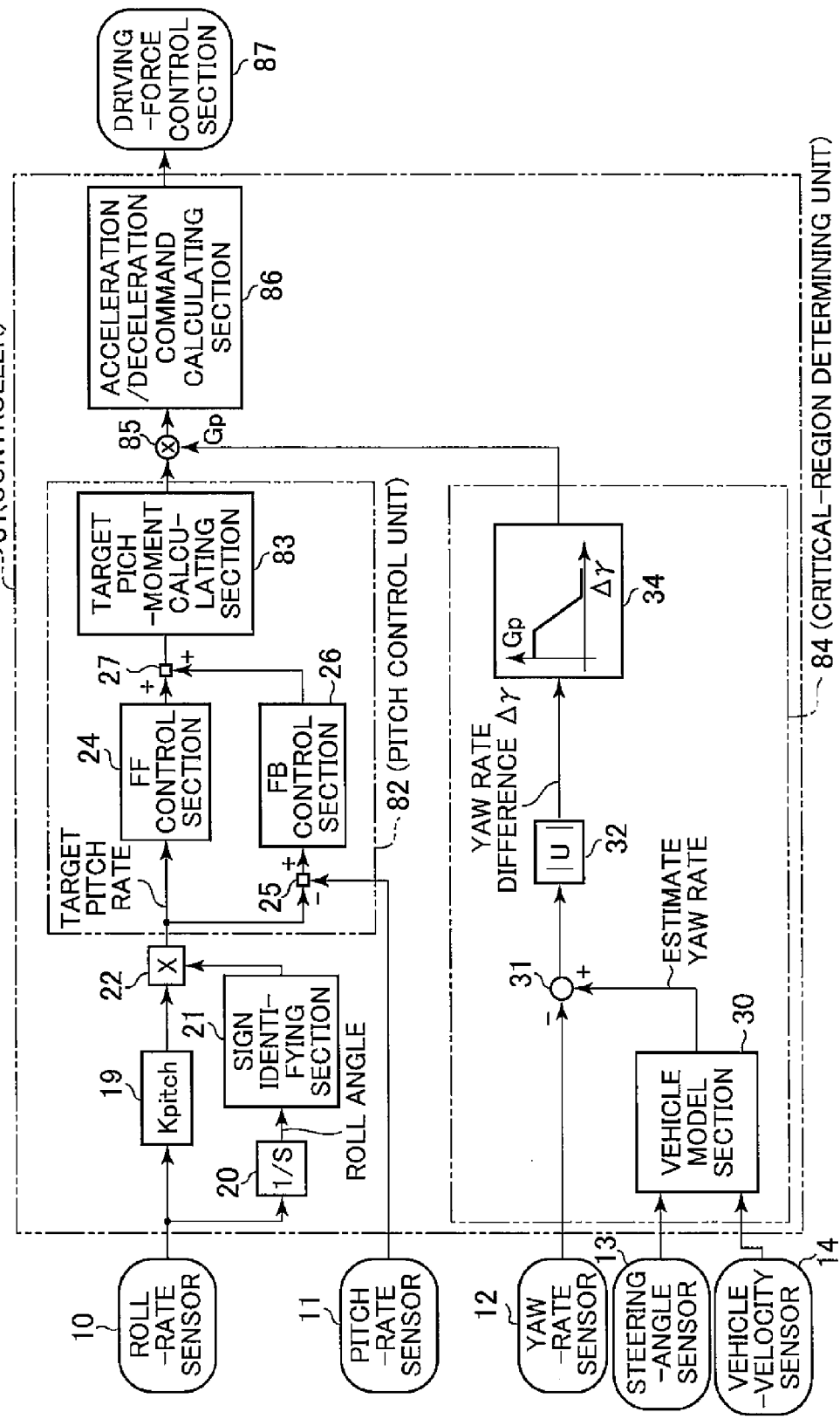
FIG. 7 is a control block diagram illustrating a vehicle attitude controller according to a fourth embodiment.
Figure 8:
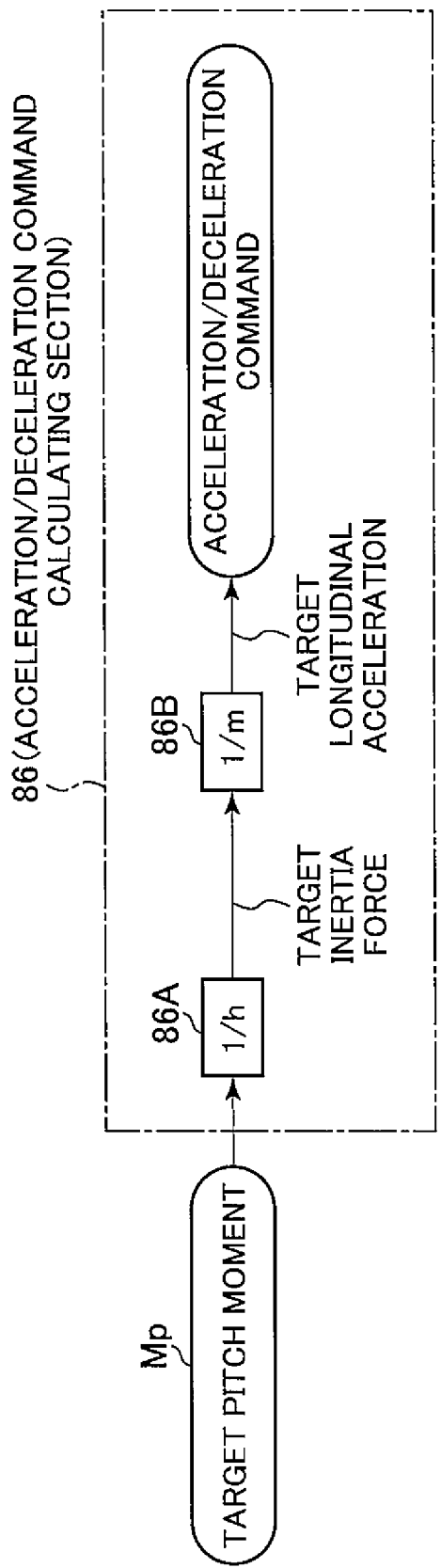
FIG. 8 is a control block diagram illustrating processing for calculating an acceleration/deceleration command for each wheel from the target pitch moment, which is performed in an acceleration/deceleration command calculating section illustrated in FIG. 7.

Next, FIGS. 7 and 8 illustrate a fourth embodiment of the present invention. The fourth embodiment has a feature that a change in vehicle attitude and a pitch behavior are caused by vehicle acceleration/deceleration control using an engine and a brake instead of causing the change in vehicle attitude by, for example, the suspensions. In the fourth embodiment, the same components as those of the first embodiment described above are denoted by the same reference numerals, and the description thereof is omitted.

FIG. 7 illustrates a controller 81 as control means used in this embodiment. The controller 81 is configured substantially similarly to the controller 15 described in the first embodiment. An input side of the controller 81 is connected to the roll-rate sensor 10, the pitch-rate sensor 11, the yaw-rate sensor 12, the steering-angle sensor 13, and the vehicle-velocity sensor 14. However, the controller 81 of this embodiment differs from the controller of the first embodiment in that an output side of the controller 81 is connected to a driving-force control section 87 described below, for controlling the engine and the brake of the vehicle.

The controller 81 includes the gain multiplying section 19, the integrating section 20, the sign identifying section 21, the multiplying section 22, a pitch control unit 82, a critical-region determining unit 84, a weighing-factor multiplying section 85, and an acceleration/deceleration command calculating section 86. Among the above-mentioned sections, the gain multiplying section 19, the integrating section 20, the sign identifying section 21, and the multiplying section 22 are configured in the same manner as those of the first embodiment.

The pitch control unit 82 includes the FF control section 24, the difference computing section 25, the FB control section 26, and the adding section 27, substantially similarly to the pitch control unit 23 described in the first embodiment. However, the pitch control unit 82 of this embodiment differs from the pitch control unit of the first embodiment in that the pitch control unit 82 includes a target pitch-moment calculating section 83 for calculating an output signal from the adding section 27 as a target pitch moment corresponding to the driving-force control section 87 described below.

The critical-region determining unit 84 includes the vehicle model section 30, the deviation computing section 31, the absolute-value computing section 32, and the map computing section 34, similarly to the critical-region determining unit 29 described in the first embodiment. However, the critical-region determining unit 84 in this embodiment differs from the critical-region determining unit 29 of the first embodiment in that a configuration corresponding to the first map computing section 33 (see FIG. 2) is omitted.

The weighing-factor multiplying section 85 is configured in substantially the same manner as that of the second weighing-factor multiplying section 36 described in the first embodiment. The weighing-factor multiplying section 85 multiplies the target pith moment output from the target pitch-moment calculating section 83 of the pitch control unit 82 by a weighing factor Gp output from the map computing section 34. In this manner, the weighing-factor multiplying section 85 weights the target pitch moment for pitch control, that is, the target pitch moment for improving the roll feeling, to be output to the driving-force control section 87. Therefore, the target pitch moment calculated in the pitch control unit 82 is set small in accordance with the degree of the critical state of the vehicle by being multiplied by the weighing factor Gp. As a result, the control placing importance on the stability is performed in the critical region.

The acceleration/deceleration command calculating section 86 performs such computation processing as illustrated in FIG. 8 on the target pitch moment weighed in the weighing-factor multiplying section 85 so as to output an acceleration/deceleration command to the driving-force control section 87. As illustrated in FIG. 8, the acceleration/deceleration command calculating section 86 divides the target pitch moment Mp (Nm) by a sprung center of gravity height h (m) of the vehicle body 1 in a first block 86A to calculate a target inertia force (N). In a second block 86B, the target inertia force is divided by a mass m (kg) of the vehicle body 1 to obtain a target longitudinal acceleration and then calculates the obtained target longitudinal acceleration as an acceleration/deceleration command.

The driving-force control section 87 outputs the thus calculated acceleration/deceleration command to driving means such as an engine or an electric motor of the vehicle and to a brake (both not shown) so as to control the engine and brake. In this manner, in a normal region, the pitch rate proportional to the roll rate is generated to stabilize the rotation axis of the vehicle body 1. As a result, the roll feeling can be improved. In the critical region, the amount of control for improving the roll feeling is reduced, placing importance on the stability. As a result, the stability of the running vehicle can be improved.

In the manner described above, even in the fourth embodiment configured as described above, the roll feeling and the stability are appropriately improved in accordance with the vehicle conditions to enable the ride quality and the steering stability of the vehicle to be both enhanced, as in the first embodiment. In the fourth embodiment, in particular, the control amount of the pitch control by the acceleration/deceleration, which is performed for improving the roll feeling in accordance with the degree of the critical state of the vehicle, is adjusted. In this manner, the amount of control of the roll feeling is reduced in the critical region to reduce a load on the tires. As a result, the acceleration/deceleration control placing importance on the stability can be performed.

In the first to third embodiments described above, the case where whether or not the tires are present in the critical region when the vehicle is running is determined based on the difference between the actual yaw rate and the estimate yaw rate so as to change the control rate of the pitch control for improving the roll feeling and the roll-suppression control for improving the stability has been described as an example. However, the present invention is not limited thereto. When it is estimated that the tires subsequently reach the critical region (it is determined that the tires are in a critical state), control for setting the control rate of the roll-suppression control for improving the stability larger than that of the pitch control for improving the roll feeling may be performed in advance. Conditions for estimating the presence of the tires in the critical region are shown in Table 1 described below. The conditions shown in Table 1 correspond to tire critical-state determining means of the vehicle-motion determining means of the present invention. More specifically, as shown in Table 1, in the case where the vehicle velocity is increased to exceed a predetermined threshold value (for example, 100 km/h), the tires are more likely to reach the critical region when the vehicle enters a corner. Therefore, the control amount of the roll-suppression control is increased and the control amount of the pitch control is reduced in advance so as to place importance on the stability. Further, without being limited to the above-mentioned case, when importance is to be placed on the stability, each of the control amounts may be adjusted so as to change each control gain in accordance with a vehicle state, to thereby improve both the roll feeling and the stability.

TABLE 1

| Signal | Determination and countermeasures |
| --- | --- |
| Vehicle velocity | High → place importance on stability |
| Yaw rate | Large difference from estimate yaw rate → place importance on stability |
| | Large → place importance on stability |
| Lateral acceleration | High → place importance on stability |
| Skid angle | Large → place importance on stability |
| Skid angular velocity | Large → place importance on stability |
| Navigation system, corner information | Large estimate gravity → place importance on stability |
| Millimeter wave, distance to object | High possibility of collision → place importance on stability |
| Camera, obstacle, corner information, behaviors of vehicle ahead | High possibility of collision → place importance on stability |
| | Large estimate lateral gravity at corner → place importance on stability |
| | Spinning of vehicle ahead or the like → place importance on stability |
| Abs/vdc actuation signal, oversteer, understeer | In operation → place importance on stability |
| | High degree → place importance on stability |
| | High degree → place importance on stability |
| Tire force, ground-contact load, lateral force, longitudinal force | Large load factor of tires → place importance on stability |
| Roll rate, | Large → place importance on stability |
| roll acceleration | Large → place importance on stability |
| Rain-drop sensor | Low road-surface friction coefficient μ → place importance on stability |

Further, in the first and third embodiments, the case where the roll rate and the pitch rate are respectively detected by using the sensors has been described as an example. However, the present invention is not limited thereto. For example, three or more vertical acceleration sensors mounted to the vehicle body may be used to calculate the roll rate and the pitch rate.

Further, as the relative velocity used in the first and second embodiments, a differential value of the detection value of the vehicle-height sensor may be used. Alternatively, a relative acceleration may be calculated from, for example, detection values of an acceleration sensor on the unsprung side and an acceleration sensor on the sprung side and is then integrated to calculate the relative velocity. Moreover, on a flat road surface, a motion on the unsprung side can be regarded as approximately zero. Therefore, a sprung velocity obtained by integrating the detection value of the acceleration on the sprung side may be used as the relative velocity. Moreover, in the second embodiment, the lateral acceleration estimated from the steering angle and the vehicle velocity is used. However, a value of a lateral acceleration sensor may be used instead. Further, a method for calculating the other signals is not particularly limited.

Next, the inventions included in the embodiments described above are described. Specifically, according to the present invention, the vehicle-motion determining means includes tire critical-state determining means for determining whether or not a tire is in a critical state in which the tire starts slipping in accordance with a vehicle-motion state; and the control rate of the control means for improving the roll feeling is increased when the tire critical-state determining means determines that the tire is in the critical state, whereas the control rate of the control means for improving the stability is increased as compared to a case where the tire critical-state determining means determines that the tire is in the critical state when the tire critical-state determining means determines that the tire is not in the critical state. Further, the tire critical-state determining means includes region determining means for determining whether or not cornering power of the tire enters a non-linear region from a linear region; and the control rate of the control means for improving the roll feeling is increased as compared to a case where the cornering power of the tire is in the non-linear region when the region determining means determines that the cornering power of the tire is in the linear region, whereas the control rate of the control means for improving the stability is increased as compared to a case where the cornering power of the tire is in the linear region when the region determining means determines that the cornering power of the tire enters the non-linear region. With the above-mentioned configuration, the roll feeling and the stability can be appropriately improved in accordance with the running conditions of the vehicle. As a result, the ride quality and the steering stability of the vehicle can be both enhanced.

Further, according to the present invention, the tire critical-state determining means increases the control rate of the control means for improving the stability when a vehicle velocity exceeds a predetermined threshold value. With the above-mentioned configuration, in the case where the running speed exceeds the threshold value, the control for improving the stability is performed preferentially to enable the steering stability to be enhanced.

The pitch-moment generating means includes: target pitch-moment calculating means for calculating a target pitch moment from the target pitch rate based on a vehicle model; and a pitch-moment generating mechanism for generating the pitch moment so that the pitch moment of the vehicle body becomes closer to the target pitch moment. Further, according to the present invention, the pitch-moment generating means includes pitch-rate detecting means for detecting the pitch rate of the vehicle body and generates the pitch moment for the vehicle body so that a difference between the detected pitch rate and the target pitch rate becomes small.

Further, according to the present invention, the vehicle includes at least four wheels; and the pitch-moment generating means is a damping-force adjusting type shock absorber having a damping-force characteristic that is adjustable, the damping-force adjusting type shock absorber being provided to each of the at least four wheels, and adjusts the pitch moment for the vehicle body by adjusting the damping-force characteristic. Further, the vehicle includes at least four wheels; and the pitch-moment generating means is an active suspension for applying a vertical force to the vehicle body and each of the at least four wheels, the active suspension being provided to the each of the at least four wheels, and applies the pitch moment to the vehicle body by adjusting the vertical force. Meanwhile, the vehicle includes at least four wheels; and the pitch-moment generating means is driving means and a brake which are provided to the vehicle and applies the pitch moment to the vehicle by adjusting a longitudinal acceleration. The roll rate of the vehicle body and the pitch rate of the vehicle body are obtained from a steering angle and a vehicle velocity.

Moreover, the control means for improving the roll feeling according to the present invention uses the target pitch-rate calculating means to obtain the target pitch rate proportional to the roll rate. The pitch-moment generating means performs the control for generating the pitch moment for the vehicle body so that the pitch moment becomes equal to the target pitch rate. In the manner described above, the proportional relation is provided to the pitch rate and the roll rate. As a result, a deviation does not occur in the rotation axis of the vehicle body, thereby improving a steering feeling.

Further, in the present invention, the target pitch-rate calculating means is configured to calculate the target pitch rate so that the degree of dive of the vehicle body increases in accordance with the magnitude of the roll rate of the vehicle body. With the configuration described above, a roll behavior with nose-dive at a decreasing pitching can be realized when, for example, the vehicle makes a turn while running. As a result, a good driver's feeling when the vehicle runs to make a turn can be provided.

According to the present invention, the pitch-moment generating means includes: the target pitch-moment calculating means (for example, two-dimensional model or differentiator) for calculating the target pitch moment from the target pitch rate based on the vehicle model; and the pitch-moment generating mechanism (including, for example, semi-active suspension or active suspension) for generating the pitch moment so that the pitch moment of the vehicle body becomes closer to the target pitch moment.

With the configuration described above, the lateral acceleration when the vehicle makes a turn while running can be obtained by using only the steering-angle sensor and the vehicle-velocity sensor without using, for example, the roll-rate sensor or the pitch-rate sensor. As a result, the number of sensors to be used can be reduced to reduce cost, thereby realizing the simplification of the system. Moreover, not only the control in consideration of the generation of pitching, which is performed for stabilizing the rotation axis, but also the control in consideration of the suppression of the roll behavior can be performed. Therefore, the improvement of the roll feeling can be realized.

Meanwhile, according to the present invention, the pitch-moment generating means includes the pitch-rate detecting means for detecting the pitch rate of the vehicle body and generates the pitch moment for the vehicle body so that the difference between the detected pitch rate and the target pitch rate becomes small. In this manner, the pitch moment can be generated for the vehicle body by using the pitch-moment generating means so that the difference between the actual pitch rate of the vehicle body, which is detected by the pitch-rate detecting means, and the target pitch rate becomes small.

Further, according to the present invention, the vehicle includes the at least four wheels; and the pitch-moment generating means and the roll suppression means are the damping-force adjusting type shock absorber having the damping-force characteristic that is adjustable, the damping-force adjusting type shock absorber being provided to each of the at least four wheels, and adjust the pitch moment and also the roll moment for the vehicle body by adjusting the damping-force characteristic.

Further, according to the present invention, the vehicle includes the at least four wheels; and the pitch-moment generating means and the roll suppression means are the active suspension for applying the vertical force to the vehicle body and each of the at least four wheels, the active suspension being provided to the each of the at least four wheels, and apply the pitch moment to the vehicle body and also perform the roll-suppression control by adjusting the vertical force. With the above-mentioned configuration, the target thrust for each wheel is calculated so that each of the active suspension generates the thrust in accordance with the target valve. As a result, the pitch rate proportional to the roll rate can be generated. Thus, the rotation axis of the vehicle body is stabilized to enable the roll feeling to be improved. At the same time, the roll-suppression control is performed to enable the stability of the vehicle to be enhanced.

In each of the embodiments described above, the computations are performed by using various values such as the roll angle, the roll rate, and the pitch rate. In the computation process, however, it is not required to obtain various values. An approximate value, an estimate value, or, for example, in the case of identification of the sign of the roll angle, another value for which only the sign changes in a similar manner to that of the roll angle, may be used. Further alternatively, a map may be used in place of the computation.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

What is claimed is:

1. A vehicle attitude controller for controlling an attitude of a vehicle body of a vehicle, comprising:
   control means for improving a roll feeling;
   control means for improving stability; and
   vehicle-motion determining means,
   wherein, to perform pitch control for improving a roll feeling, the control means for improving the roll feeling includes:
      target pitch-rate calculating means for calculating a target pitch rate corresponding to a target value of a pitch rate of the vehicle body so that the pitch rate increases in accordance with a magnitude of a roll rate of the vehicle body; and
      pitch-moment generating means for generating a pitch moment for the vehicle body so that the pitch rate of the vehicle body becomes closer to the target pitch rate;
   wherein the control means for improving the stability includes roll suppression means for generating a force for suppressing roll; and
   wherein the vehicle-motion determining means is configured so that the vehicle-motion determining means can switch a control rate between the control means for improving the roll feeling and the control means for improving the stability in accordance with a vehicle motion, and, before the vehicle enters a critical condition where a tire starts sliding, the control rate is switched so that the control rate of the control means for improving the stability is increased.

2. A vehicle attitude controller according to claim 1, wherein:
   the vehicle-motion determining means includes tire critical-state determining means for determining whether or not a tire is in a critical state in which the tire starts slipping in accordance with a vehicle-motion state; and
   the control rate of the control means for improving the roll feeling is increased when the tire critical-state determining means determines that the tire is in the critical state, whereas the control rate of the control means for improving the stability is increased as compared to a case where the tire critical-state determining means determines that the tire is in the critical state when the tire critical-state determining means determines that the tire is not in the critical state.

3. A vehicle attitude controller according to claim 2, wherein:
   the tire critical-state determining means includes region determining means for determining whether or not cornering power of the tire enters a non-linear region from a linear region; and
   the control rate of the control means for improving the roll feeling is increased as compared to a case where the cornering power of the tire is in the non-linear region when the region determining means determines that the cornering power of the tire is in the linear region, whereas the control rate of the control means for improving the stability is increased as compared to a case where the cornering power of the tire is in the linear region when the region determining means determines that the cornering power of the tire enters the non-linear region.

4. A vehicle attitude controller according to claim 2, wherein the tire critical-state determining means determines that the tire is in the critical state when a vehicle velocity exceeds a predetermined threshold value.

5. A vehicle attitude controller according to claim 2, wherein the pitch-moment generating means includes:
   target pitch-moment calculating means for calculating a target pitch moment from the target pitch rate based on a vehicle model; and
   a pitch-moment generating mechanism for generating the pitch moment so that the pitch moment of the vehicle body becomes closer to the target pitch moment.

6. A vehicle attitude controller according to claim 2, wherein the pitch-moment generating means includes pitch-rate detecting means for detecting the pitch rate of the vehicle body and generates the pitch moment for the vehicle body so that a difference between the detected pitch rate and the target pitch rate becomes small.

7. A vehicle attitude controller according to claim 2, wherein:
   the vehicle includes at least four wheels; and
   the pitch-moment generating means comprises a damping-force adjusting type shock absorber having a damping-force characteristic that is adjustable, the damping-force adjusting type shock absorber being provided to each of the at least four wheels, and adjusts the pitch moment for the vehicle body by adjusting the damping-force characteristic.

8. A vehicle attitude controller according to claim 2, wherein:
   the vehicle includes at least four wheels; and
   the pitch-moment generating means comprises an active suspension for applying a vertical force to the vehicle body and each of the at least four wheels, the active suspension being provided to the each of the at least four wheels, and applies the pitch moment to the vehicle body by adjusting the vertical force.

9. A vehicle attitude controller according to claim 2, wherein:
   the vehicle includes at least four wheels; and
   the pitch-moment generating means comprises driving means and a brake which are provided to the vehicle and applies the pitch moment to the vehicle by adjusting a longitudinal acceleration.

10. A vehicle attitude controller according to claim 1, wherein the pitch-moment generating means includes:
    target pitch-moment calculating means for calculating a target pitch moment from the target pitch rate based on a vehicle model; and
    a pitch-moment generating mechanism for generating the pitch moment so that the pitch moment of the vehicle body becomes closer to the target pitch moment.

11. A vehicle attitude controller according to claim 1, wherein the pitch-moment generating means includes pitch-rate detecting means for detecting the pitch rate of the vehicle body and generates the pitch moment for the vehicle body so that a difference between the detected pitch rate and the target pitch rate becomes small.

12. A vehicle attitude controller according to claim 1, wherein:
    the vehicle includes at least four wheels; and
    the pitch-moment generating means comprises a damping-force adjusting type shock absorber having a damping-force characteristic that is adjustable, the damping-force adjusting type shock absorber being provided to each of the at least four wheels, and adjusts the pitch moment for the vehicle body by adjusting the damping-force characteristic.

13. A vehicle attitude controller according to claim 1, wherein:
the vehicle includes at least four wheels; and
the pitch-moment generating means comprises an active suspension for applying a vertical force to the vehicle body and each of the at least four wheels, the active suspension being provided to the each of the at least four wheels, and applies the pitch moment to the vehicle body by adjusting the vertical force.

14. A vehicle attitude controller according to claim 1, wherein:
the vehicle includes at least four wheels; and
the pitch-moment generating means comprises driving means and a brake which are provided to the vehicle and applies the pitch moment to the vehicle by adjusting a longitudinal acceleration.

15. A vehicle attitude controller according to claim 1, wherein the roll rate of the vehicle body and the pitch rate of the vehicle body are obtained from a steering angle and a vehicle velocity.

* * * * *